United States Patent [19]

Thomas et al.

[11] 4,063,266
[45] Dec. 13, 1977

[54] ADJUSTABLE POLARIZED FILTERS FOR CAMERAS

[76] Inventors: Robert R. Thomas; Camille C. Thomas, both of 5180 Revere St., Apt. No. 1, Chino, Calif. 91710

[21] Appl. No.: 724,712

[22] Filed: Sept. 20, 1976

[51] Int. Cl.² .................. G02B 5/22; G02B 5/30; G03B 11/00
[52] U.S. Cl. .................. 354/295; 350/147; 350/317; 354/76
[58] Field of Search ............... 350/147, 311, 317, 318; 354/76, 295, 270

[56] References Cited

U.S. PATENT DOCUMENTS

| | | |
|---|---|---|
| 2,142,657 | 1/1939 | Sauer et al. .................. 350/147 UX |
| 2,169,688 | 8/1939 | Frotschner .................. 354/126 X |
| 2,184,015 | 12/1939 | McFarlane .................. 350/147 UX |
| 2,190,718 | 2/1940 | Kuppenbender .................. 354/76 |
| 2,695,553 | 11/1954 | Tate .................. 350/317 |

*Primary Examiner*—John Gonzales
*Attorney, Agent, or Firm*—Allan M. Shapiro

[57] ABSTRACT

Filter case rotatably carries two filter retainers each with a linearly polarized filter, each at the same angular position. A perforated belt engages around the sprocket teeth on the filter retainers so that the two filters are rotated together. Filter case is removably attached to the camera body.

7 Claims, 4 Drawing Figures

U.S. Patent     Dec. 13, 1977     4,063,266
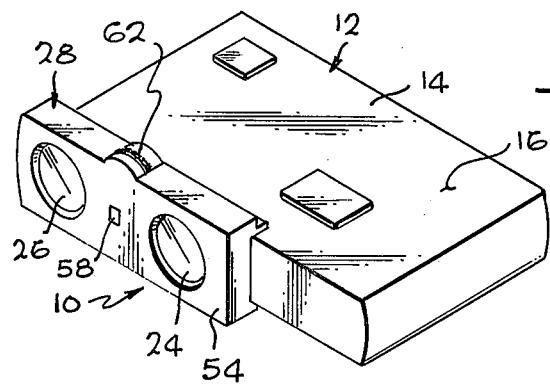
Fig. 1
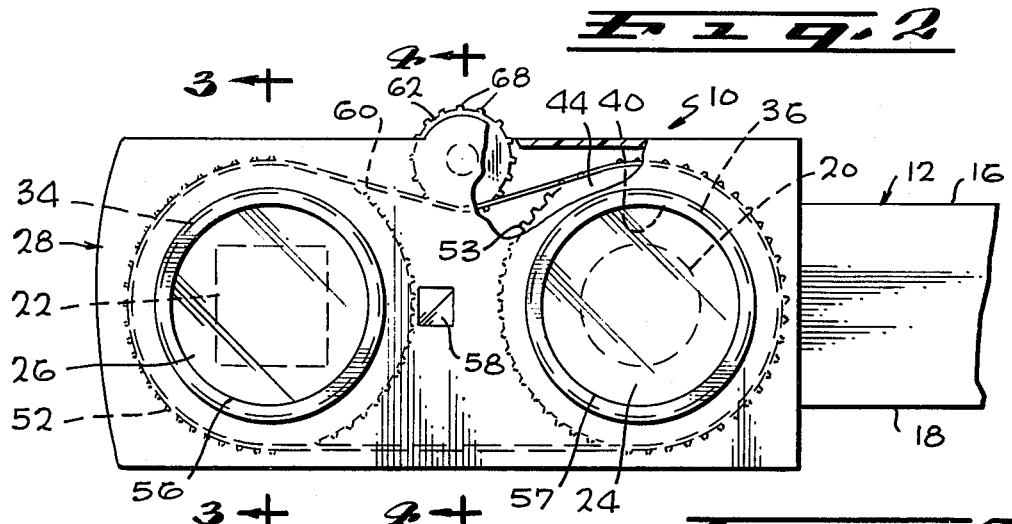
Fig. 2
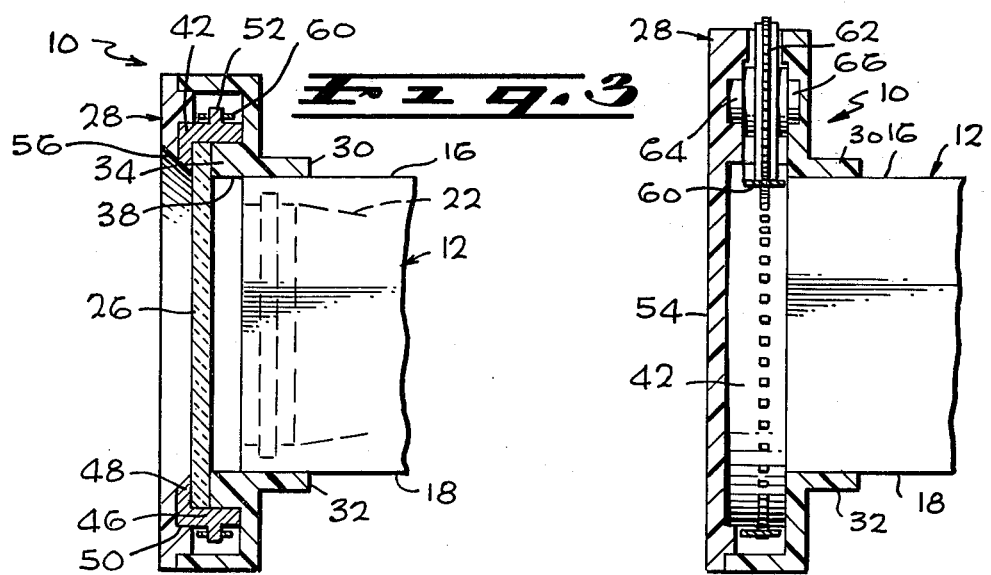
Fig. 3
Fig. 4

ADJUSTABLE POLARIZED FILTERS FOR CAMERAS

BACKGROUND OF THE INVENTION

1. Field of the Invention

This invention is directed to a filter structure for cameras where the filter case is removably attached to the camera case, and two polarized filters are rotated together.

2. Description of the Prior Art

The majority of inexpensive cameras are in that class known as "viewfinder cameras." The viewfinder through which the photographer sees the scene toward which his lens is directed is separate from the lens. This simplifies the viewfinder optics, but presents other problems. For example, setting the proper focal position of the lens must be accomplished by using estimated distance to the object, by using an optical range finder, or, in the most inexpensive cameras, by using a lens of sufficiently small aperture that it has a depth of focus over a useful range without focusing.

When a lens filter is desired, the effect of colored filters on black and white film can be readily assessed from previous experience, and there is no need to see through the colored filter. In fact, viewing through a colored filter presents information to the eye which does not correspond to the manner in which that filter acts with respect to the sensitivity spectrum of black and white film; however, when considering color film, the only useful filter is the polarized filter. It is employed to reduce glare and soften bright reflections. As contrasted to the color filter, the scene must be observed through the polarized filter because the polarized filter must be angularly set to achieve the desired glare reduction. Thus, the same filter angle must be achieved over both the viewfinder and the lens. Such structure has not been available for inexpensive cameras where the filter case attaches to the camera body and can be readily installed and removed by the photographer.

SUMMARY OF THE INVENTION

In order to aid in the understanding of this invention, it can be stated in essentially summary form that it is directed to adjustable polarized filters for cameras. The filter structure includes a filter case which rotatably carries two polarized filters thereon with the filters being connected by a perforated belt-sprocket arrangement so they rotate together. The filter case is removably attached to the camera body with one filter over the viewfinder and the other filter over the camera lens.

It is thus an object of this invention to provide adjustable polarized filters for cameras, particularly with removable attachment of the filter case to the camera body so that the filters can be attached and removed from the camera body as required and without interfering with the lens. It is another object to provide an adjustable polarized filter structure wherein two polarized filters are rotatably mounted on on a filter case and are coupled together so that they rotate together and are maintained in the same polarized angle position. It is a further object to provide an inexpensive polarized filter structure which can be quickly attached and detached from an inexpensive camera so that it can be widely employed and not require the services of camera technicians for installation.

The features of the present invention which are believed to be novel are set forth with particularity in the appended claims. The present invention, both as to its organization and manner of operation, together with the further objects and advantages thereof, may be best understood by reference to the following description, taken in conjunction with the accompanying drawings wherein like numerals designate like parts in the several figures.

BRIEF DESCRIPTION OF THE DRAWINGS

FIG. 1 is an isometric view of a camera carrying the adjustable polarized filter structure of this invention thereon.

FIG. 2 is a front-elevational view of the adjustable polarized filter structure, with parts broken away and parts taken in section.

FIG. 3 is a section taken generally along the line 3—3 of FIG. 2.

FIG. 4 is a section taken generally along the line 4—4 of FIG. 4.

DESCRIPTION OF THE PREFERRED EMBODIMENT

In each of FIGS. 1,2,3, and 4, the adjustable polarized filter structure of this invention is generally indicated at 10 and is shown as being attached to camera 12. Camera 12 has body 14 which has top surface 16 and bottom surface 18. Camera 12 is illustrated as being a Kodak "Instamatic" which is a widely used, inexpensive camera. While that particular camera is illustrated, it will be clear from the following description that the adjustable polarized filter structure 10 is useful on many similar cameras. Camera 12 includes lens 20 through which exposure is made to take the picture and viewfinder 22 through which is viewed the scene corresponding to the photograph to be taken.

It often is desirable to employ a polarized filter over the lens to reduce glare and reflections when taking color pictures. For this purpose, polarized filter 24 is positioned over lens 20. In order to observe the effect of the polarization, a similar polarized filter 26 is mounted over the viewfinder.

Filter case 28 has upper and lower flanges 30 and 32 which respectively embrace the top and bottom surfaces 16 and 18 of a camera body. Filter case 28 is made of resilient, but almost rigid synthetic polymer composition material and is dimensioned so that the flanges firmly engage the camera body, but permit manual attachment and detachment of the filter case from the camera body without the need for tools or technical skill. The fit is tight enough so that the filter case stays in place until its removal is desired.

Filter case 28 has circular bosses 34 and 36 respectively positioned around apertures 38 and 40 which are respectively positioned in front of viewfinder 22 and lens 20. Polarized filters 24 and 26 are retained in position by means of retainers engaged over the polarized filters and rotatably mounted on the circular bosses. Retainers 42 and 44 are respectively shown in FIGS. 3 and 2. They are identical. Retainer 42 is shown in section through a diameter of the circular structure. It has a tubular, cylindrical outer shell 46 which is a sliding fit around circular boss 34. Retainer 42 has an inwardly directed flange 48 at the front edge of shell 46. Polarized filter 26 is cemented under flange 48 so that it is irrotatably fixed in retainer 42. The outer surface 50 of shell 46 is also cylindrical and carries a plurality of sprocket teeth 52 thereon. Similarly, sprocket teeth 53 (see FIG. 2) are carried on the exterior surface of retainer 44.

Cover 54 forms the front of filter case 28. It engages on the front of retainers 42 and 44 to hold the retainers on their bosses 34 and 36. As illustrated in FIG. 3 in the preferred embodiment, the cover may also have a boss extending around the outer surface 50 of the retainer to give the retainer further support. Cover 54 has apertures 56 and 57 in front of these polarized filters. At least the central portion of the cover over light-sensing cell 58 on the camera is transparent and has a filter therein of the average density of filters 24 and 26. The entire cover may be of such material, but preferably an aperture containing such a filter is positioned over cell 58, as illustrated, where the filter is coextensive with the cell.

Belt 60 is a perforated, continous belt which engages around both retainers 42 and 44 with its perforations engaging over sprocket teeth 52 and 53. Belt 60 is made of a flexible, synthetic polymer composition material having only moderate stretch characteristics, such as prestretched nylon.

Adjusting wheel 62 is formed with its own bosses 64 and 66 which are rotatably journaled within bearing openings in the cover and main body of the filter case. Adjusting wheel 62 extends out of the top of the filter case for manual engagement and extends into the path of belt 60. Sprocket teeth 68 are formed on the exterior of the adjusting wheel and engage in the sprocket holes in the belt. Thus, manual rotation of the adjusting wheel causes rotation of both filter retainers and the filters mounted therein. Since the filter retainers are of the same outside diameter, they rotate at the same rotative speed. On assembly of the structure, the filters are positioned at the same angular position of polarization so that, as the polarized filters rotate, their polarization planes remain parallel.

In use, filter case 28 is pressed onto the front of camera 12 so that the polarized filters and their apertures are positioned over the viewfinder and lens of the camera. While viewing the scene through the viewfinder, the photographer rotates adjusting wheel 62. This moves belt 60 and rotates both of the polarized filters. While rotating the filter over the viewfinder, the photographer observes the scene and adjusts the filter until the desired polarization effect is achieved on reflected light and glare. Since the filter 24 over the photographic lens is rotated at the same time and to the same angular position, the same polarization effect is achieved in the picture. By this means, glare and reflections are controlled as desired.

When desired, the filter case can be readily slipped from the camera without the use of tools to leave the camera unchanged. Thus, any camera user can place the adjustable polarized filter 10 on the camera and remove it from the camera without difficulty. This convenience is achieved in a great part due to the mounting of filter 10 on the camera body rather than on the lens structure or the lens mount structure.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. Adjustable polarized filters for cameras comprising:
   a filter case, means on said filter case for detachable attachment of said filter case on a camera body;
   an aperture in said filter case positioned to be in front of the viewfinder and another aperture in said filter case positioned to be in front of the lens of the camera when said filter is mounted on the camera body;
   a cylindrical boss around each of said apertures;
   first and second polarized filters in said filter case;
   a pair of filter retainers, each of said filter retainers being formed of a cylindrical shell and an inwardly directed flange, each said filter being positioned inside said shell and secured against said flange so that each said filter rotates with its filter retainer, said filter retainers being respectively mounted on said bosses so that said polarized filters are positioned in said filter case for being positioned over the viewfinder and over the photographic lens of the camera when said filter case is mounted on a camera body; and
   a belt connected around said filter retainers, means engaging said belt for manual movement of said belt so that, upon motion of said belt, both of said filters rotate the same angular amount.

2. The adjustable polarized filters for cameras of claim 1 wherein:
   there is an outer surface on each said shell and said belt engages on said outer surface.

3. The adjustable polarized filters for cameras of claim 2 wherein:
   said belt is perforated and there are sprocket teeth extending from said outer surface of each said shell and engaging said perforations in said belt so that said two filters are positively rotated together.

4. The adjustable polarized filters for cameras of claim 3 wherein:
   said means engaging said belt for manual movement of said belt comprises an adjusting wheel having sprocket teeth therein, said adjusting wheel being positioned between said filter retainers, and said teeth on said adjusting wheel engaging said perforations in said belt so that rotation of said adjusting wheel positively moves said belt.

5. The adjustable polarized filters for cameras of claim 4 wherein:
   said filter case comprises a main case member and a cover thereon, said adjusting wheel having bosses thereon rotatably journalled in said main case member and said cover so that said adjusting wheel is rotatably mounted between said main case member and said case cover.

6. The adjustable polarized filters for cameras of claim 1 wherein:
   said filter case is formed of a main case member and a case cover, said bosses being formed in said main case member and said cover engaging over said filter retainers to hold said filter retainers on said bosses.

7. The adjustable polarized filters for cameras of claim 6 wherein:
   said case cover has a portion therein of substantially the same transparency as said filters, said portion being positioned over the light-sensing cell of a camera when said filter case is positioned on a camera.

* * * * *